United States Patent
Rhyne et al.

[11] Patent Number: 5,413,145
[45] Date of Patent: May 9, 1995

[54] LOW-PRESSURE-DROP CRITICAL FLOW VENTURI

[75] Inventors: Lee D. Rhyne, Rosenburg; James R. Stoy, Missouri City, both of Tex.

[73] Assignee: Texaco Inc., White Plains, N.Y.

[21] Appl. No.: 200,087

[22] Filed: Feb. 22, 1994

Related U.S. Application Data

[63] Continuation-in-part of Ser. No. 47,525, Apr. 19, 1993, abandoned.

[51] Int. Cl.⁶ .............................................. F15D 1/06
[52] U.S. Cl. ......................................... 138/44; 138/40
[58] Field of Search .............................. 138/40, 44, 45

[56] References Cited

U.S. PATENT DOCUMENTS

| | | | |
|---|---|---|---|
| 513,318 | 1/1894 | Grimm | 138/44 |
| 1,633,352 | 6/1927 | Tate | 138/44 |
| 2,401,665 | 6/1946 | Schick | 138/44 |
| 2,463,239 | 3/1949 | Bowman et al. | 138/44 |
| 2,568,519 | 9/1951 | Smith | 138/40 |
| 3,145,529 | 8/1964 | Maloof | 138/44 |
| 3,192,709 | 7/1965 | Hardy | 138/44 |
| 4,054,157 | 10/1977 | Moseley | 138/44 |
| 4,324,112 | 4/1982 | Fujiwara et al. | 138/44 |

FOREIGN PATENT DOCUMENTS 25502 12/1951 Finland .............................. 138/44

*Primary Examiner*—James E. Bryant, III
*Attorney, Agent, or Firm*—James L. Bailey; Kenneth R. Priem; William J. Beard

[57] ABSTRACT

A low-cost low-pressure drop critical flow venturi is formed from a single rigid member with mirror image inlet and diffuser sections. The mirror imaging allows the member to be mounted in a flow stream, without regard to the direction of flow, and to still be operative.

7 Claims, 1 Drawing Sheet

LOW-PRESSURE-DROP CRITICAL FLOW VENTURI

CROSS REFERENCE TO RELATED APPLICATION

The present application is a continuation-in-part of our earlier patent application Ser. No. 08/047,525 filed Apr. 19, 1993, now abandoned.

BACKGROUND OF THE INVENTION

1. The Field of the Invention

The present invention relates to pressure difference creating devices which are used to control the rate of fluid flow in pipe sections and in particular to a Venturi of a new design which minimizes the pressure loss across it.

2. The Prior Art

Many devices which are used to control the rate of compressible fluid flow do so by inducing critical flow. The critical flow phenomena is defined in the art as the conditions which exist at the point where the fluid flow rate becomes independent of downstream pressure. These conditions occur because of the induced pressure discontinuity caused by sonic velocity having been reached in the device. When such devices are designed to minimize the pressure loss obtained in the device, they are known as Venturi tubes. Venturi tubes heretofor available have been long, generally difficult to manufacture requiring multipart construction and accurate assembly, difficult to install with standard couplings, and have an inherent one-way flow direction. Flow rate controlling devices, such as the venturi tube, are used commonly in the conveyance of steam in oil fields undergoing steam enhanced recovery treatment and also in the nuclear power industry to control steam in reactors.

A venturi is a shaped obstruction placed in a pipe to restrict the flow therethrough. The amount of flow is determined by the pressure difference across the obstruction, the properties of the flowing medium, and the specific geometry of the obstruction. When the mass flow rate of the medium no longer increases with increasing pressure drop, the flow has achieved a critical flow rate. The pressure drop necessary to obtain critical flow rate is extremely dependent on the geometry of the obstruction.

In many applications it is desirable to achieve critical flow for flow measurement or flow regulation. In some situations, a desired state is to achieve critical flow with as little pressure drop as possible, for example around 5–20% pressure drop. In other situations it is desirable to have a short venturi and/or even one which could handle flow from either direction.

In prior designs of Venturi tubes, most tubes were constructed in two or three parts, namely, 1) an inlet section, 2) a straight throat section, and 3) a diffuser section. The straight throat section, however, has not been found to be advantageous for critical flow devices. Some venturi tubes therefore omit the straight throat section and simply connect the inlet directly to the diffuser section. The straight throat section is often used in other applications, such as venturi scrubbers. An example of the straight throat section can be found in U.S. Pat. No. 1,850,030. Virtually all other venturi tubes have conical diffuser section of approximately 5° cone angles, for example U.S. Pat. No. 4,174,734. Some devices have several segments of successively larger conical angles, as illustrated by U.S. Ser. No. 816,280 and U.S. Pat. No. 4,648,455. Venturi meters have a pressure sampling device in the throat and are designed to operate in sub-critical ranges. All prior inventions use a short inlet section and a long tapered diffuser section, regardless of whether or not a straight intermediate throat section is used. It will be noted that all of this prior art concerns venturi devices of relatively great length, in proportion to their diameter, and that they are suitable for flow in a single direction.

SUMMARY OF THE INVENTION

The present invention is a low pressure drop critical flow venturi device which has a short inlet section followed by an identically shaped diffuser section (mirror-imaged) with substantially no straight intermediate throat section therebetween. The present invention is characterized by the toroidal shape for the diffuser, the symmetrical flow path and the shortness of the device. There are no pressure taps. The critical flow rate through this device is described by the same equations, regardless of direction of flow. The angle subtended by cross-section of the toroidal opening can be any angle between 90° and 180°.

An object of the present invention is to allow easy manufacture and installation of a venturi device while still maintaining very low pressure losses. This invention is symmetrical about a plane perpendicular to the path of fluid flow and thus will control steam flow in either direction. This invention is short (relative to conventional venturi tubes) and will easily fit between standard flange couplings commonly used in the steam industry without regard to orientation of the device with respect to flow direction. This invention can be easily and quickly manufactured in standard machine shops using commercial equipment.

The invention resembles a very thick, rigid or incompressible circular orifice plate, with the thickness of the plate being determined, in part, by the desired flow rate. An opening is formed, for example by machining, into the center of this squat cylinder that is best described as the inner surface of a toroid or near-toroid (like the hole of a donut). This invention defines an opening which is symmetrical both radially and in cross-section. The size of the hole at its minimum diameter determines, in part, the flow rate of the fluid for a given upstream pressure.

BRIEF DESCRIPTION OF THE DRAWINGS

The present invention will now be described, by way of example, with reference to the accompanying drawings wherein.

DETAILED DESCRIPTION OF THE PREFERRED EMBODIMENT

Figure 1:
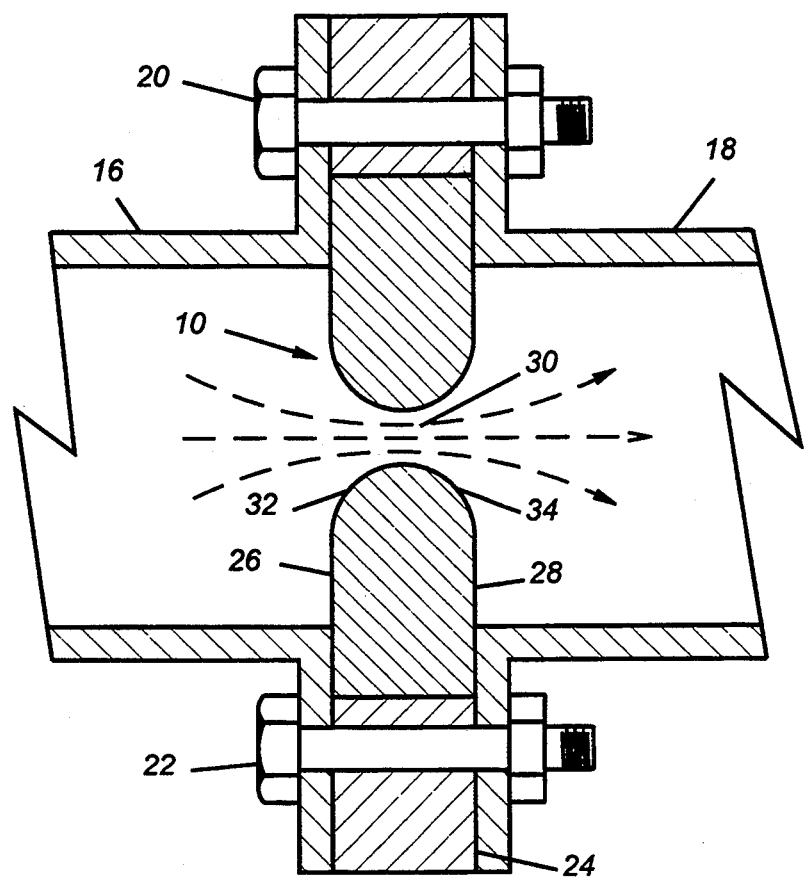
FIG. 1 is a longitudinal section through the present invention mounted in a flow pipe.
Figure 2:
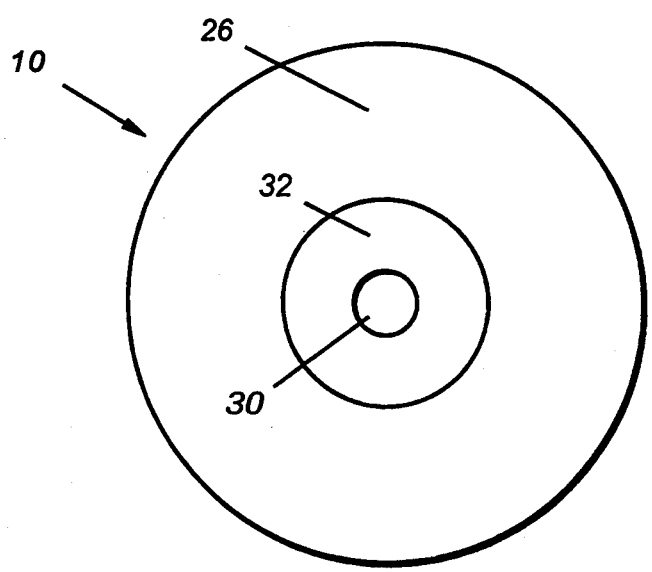
FIG. 2 is a plan view of the subject invention.

The subject venturi device 10 is shown in section in FIG. 1 mounted between flanges 12, 14 of standard steam pipes 16, 18. The device is here shown secured between the flanges by standard bolts 20, 22 and an annular spacer 24. The conventional gaskets, which would be included in such a connection, have not been shown both for clarity of the drawings and since they do not form part of the present invention. The device 10 is preferably a solid metal plate defining a short cylinder having parallel spaced flat surfaces 26, 28 and a central aperture 30 formed by mirror image surfaces 32, 34. The device is characterized by the fact that there is substantially a total absence of any portion which could be considered to be a straight throat. The present invention comprises only mirror image inlet and diffuser sections and, since these are mirror images, they are interchangeable in function. Thus the present invention does not have an "up stream" side nor a "down stream" side. It is, in fact, reversible.

The plate has been shown solid and hatched for metal. However, it is within the scope of the present invention to manufacture this plate out of any suitable material including, but not restricted to, metal, glass, ceramics, in fact anything which will withstand the temperatures and pressures of a steam flow system without deforming or disintegrating. While machining metal is the preferred method for forming the present invention, it could also be cast or blow molded in either a solid or hollow embodiment, as long as the incompressible requirement was met as the device must hold its shape to function properly.

This device has been tested with wet steam at pressures of up to 800 psig. Critical flow occurs with pressure losses of 18–35% (as defined by the ratio of inlet minus outlet pressures to inlet pressure). The flow rate for these devices is described by an equation of the form:

$$\text{mass flow rate} = \frac{A \cdot P_{upstream} \cdot Diam_{throat}^2}{\text{Quality}^B}$$

where A and B are empirically derived constants which depend on the exact geometry of the device.

The present invention is a new design for a critical flow venturi which will achieve critical flow at very low pressure drops across the venturi. This invention is specifically designed to significantly reduce the difficulty and cost of manufacture of the venturi thereby making it significantly cheaper than other low pressure drop venturi devices. The subject venturi is specifically designed to achieve critical flow at very low pressure drops across it.

The subject venturi, in use, requires a pair of flanges to facilitate installation and removal of the venturi. The requirement for a mounting cage, such as that shown in U.S. Pat. No. 5,141,055 and often associated with standard venturi devices, has been obviated.

This invention uses a toroidal shaped opening through which the fluid flows, as shown by the arrows in FIG. 1. As shown in cross-section, the throat opening is a sector of a circle. The opening size can be formed to achieve any desired critical mass flow rate.

This invention preferably has a thickness twice the internal diameter of the throat and can be easily machined from a single piece of stock, without sectioning, thus greatly reducing the cost of manufacture. It would require less time and material to fabricate the present invention than prior art venturi devices. While reference has been made to machining, the present invention can be manufacture by other standard processes, such as molding or casting.

This invention allows the venturi to be inserted into the line with a single pair of flanges in a fashion similar to a common orifice plate. Since the subject venturi has a mirror image shape, it is reversible and cannot be improperly installed.

The present invention can be subject to many modifications and changes without departing from the spirit or essential characteristics thereof. The present embodiment is therefore to be considered in all respects as illustrative and not restrictive of the scope of the invention.

We claim:

1. A shaped obstruction placed in a compressible fluid flowline to restrict flow therethrough, comprising:

a venturi having a relatively low pressure drop across an axial flow opening at critical fluid flow rate where the mass flow rate of the fluid does not increase with an increase in upstream pressure in the fluid, said venturi having an upstream inlet section and a downstream diffuser section, said inlet section and said diffuser section being symmetrical to each other in any plane perpendicular to the direction of fluid flow and said inlet section and said diffuser section also being radially symmetrical to each other about the central axis of said flow opening in all directions, said inlet section being the mirror image of said diffuser section and each section being continuously curvilinear in shape with no straight line portion, the juncture of said inlet section and said diffuser section at the center plane of said venturi perpendicular to the direction of fluid flow defining the interior of a torodially shaped axially oriented flow opening.

2. The device of claim 1 wherein said venturi further comprises a right circular cylinder having a thickness less than its diameter formed of a rigid noncompressible material capable of use in a steam flow line.

3. The device of claim 2 wherein said axial flow opening is shaped by boring and machining a circular cross sectional hole along the central axis of said right circular cylinder and wherein the outside walls of said right circular cylinder remain intact.

4. The device of claim 3 in which said right circular cylinder comprises a solid metal member.

5. The device of claim 3 wherein the thickness of said right circular cylindrical member is at least twice the minimum diameter of said axial flow opening.

6. The device of claim 1 and further comprising an annular member sized and adapted for flange mounting in a steam flow line for mounting said venturi in a steam flowline.

7. The device of claim 1 wherein said inlet section and said diffuser section are interchangeable.

* * * * *